United States Patent [19]
Apfel et al.

[11] 3,761,160
[45] Sept. 25, 1973

[54] WIDE BAND ANTI-REFLECTION COATING AND ARTICLE COATED THEREWITH

[75] Inventors: Joseph H. Apfel; Carol J. Snavely, both of Santa Rosa, Calif.

[73] Assignee: Optical Coating Laboratories, Inc., Santa Rosa, Calif.

[22] Filed: May 31, 1972

[21] Appl. No.: 258,422

Related U.S. Application Data

[63] Continuation of Ser. No. 128,946, March 29, 1971, abandoned, which is a continuation-in-part of Ser. No. 758,254, Sept. 9, 1968, abandoned.

[52] U.S. Cl. ............................. 350/164, 117/33.3
[51] Int. Cl. ............................................. G02b 5/28
[58] Field of Search .................... 350/1, 164–166; 117/33.3

[56] References Cited
UNITED STATES PATENTS

| 3,235,397 | 2/1966 | Millendorfer | 350/164 |
| 3,432,225 | 3/1969 | Rock | 350/164 |

FOREIGN PATENTS OR APPLICATIONS

| 921,751 | 3/1963 | Great Britain | 350/164 |

*Primary Examiner*—David Schonberg
*Assistant Examiner*—Ronald J. Stern
*Attorney*—Flehr, Hohbach et al.

[57] ABSTRACT

Wide band anti-reflection coating and article coated therewith having at least four layers for high index glasses and at least six layers for low index glasses.

4 Claims, 4 Drawing Figures

PATENTED SEP 25 1973                                                3,761,160

INVENTOR.
Joseph H. Apfel
Carol J. Snavely
BY Flehr, Hohbach, Test,
Albritton & Herbert
Attorneys

WIDE BAND ANTI-REFLECTION COATING AND ARTICLE COATED THEREWITH

CROSS REFERENCE TO RELATED APPLICATION

This is a continuation of application Ser. No. 128,946 filed Mar. 29, 1971 and now abandoned, which is a continuation-in-part of application Ser. No. 758,254, filed Sept. 9, 1968 and now abandoned.

BACKGROUND OF THE INVENTION

Anti-reflection coatings have heretofore been provided. However, it has been found that these anti-reflection coatings have certain limitations. For example, it has been found that anti-reflection coatings which have been manufactured for use in the visible portion of the spectrum have a slight absorption in the near ultra-violet region where high transparency is extremely important for photographic applications. Lens system coated with such anti-reflection coatings tend to yield photographs which are yellow in color and which are unacceptable to optical equipment manufacturers. There is, therefore, a need for a new and improved anti-reflection coating.

SUMMARY OF THE INVENTION AND OBJECTS

The coated article comprises a substrate having a normal light reflecting surface with an anti-reflection coating disposed on the surface and exposed to the medium in which the article is to be used. The anti-reflection coating is comprised of at least first, second, third and fourth layers counting in direction from the medium and being formed of materials having high and low indices of refraction. The first and second layers are formed respectively of low and high index materials, and the third and fourth layers are also formed respectively of low and high index materials. The first layer has an optical thickness of approximately one-quarter of the design wavelength. The second and fourth layers are of approximately equal optical thickness and the third layer is relatively thin but has a thickness such that the second and fourth layers function as independent layers rather than as a single layer. For low index glasses, the anti-reflection coating has additional fifth and sixth layers which are formed respectively of low and high index materials with the fifth and sixth layers having a combined optical thickness of approximately one-quarter of the design wavelength. The thickness of the fifth and sixth layers is such that they yield a reflectance which is achieved by a single layer of equal thickness and having an index of refraction intermediate that of the low and high index materials used for the fifth and sixth layers.

In general, it is an object of the present invention to provide a wide band anti-reflection coating and article coated therewith which have substantially no absorption in the ultra-violet region.

Another object of the invention is to provide a coating and article of the above character which does not necessarily require the use of oxygen being bled into the vacuum chamber during formation of the coating.

Another object of the invention is to provide a coating and article of the above character which can be utilized for both high and low index glasses.

Another object of the invention is to provide a coating and article of the above character which has excellent characteristics for specular reflectance, adhesion and environmental durability.

Another object of the invention is to provide a coating and article of the above character in which the coating has excellent anti-reflection characteristics for the visible region on glasses having indices of refraction between 1.50 and 1.89.

Additional objects and features of the invention will appear from the following description in which the preferred embodiments are set forth in detail in conjunction with the accompanying drawing.

DESCRIPTION OF THE PREFERRED EMBODIMENTS

Figure 1:
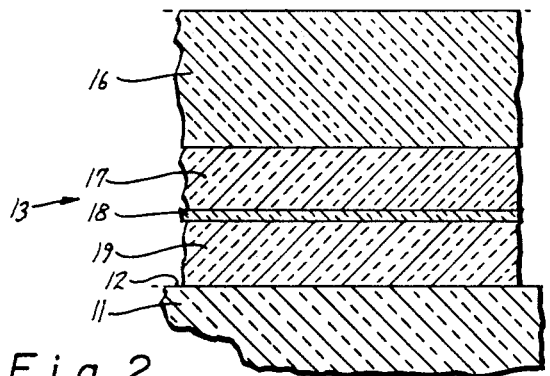
FIG. 1 is a partial cross-sectional view of an article having a coating thereon incorporating the present invention using at least four layers and being particularly adaptable for glasses having indices of refraction from 1.60 to 1.89.

A partial cross-sectional view of a coated article incorporating the present invention is shown in FIG. 1. The coated article consists of a substrate 11 which has a normal light reflecting surface 12. A multi-layered anti-reflecting coating 13 is disposed on the light reflecting surface 12 and is comprised of at least four layers which can be identified counting from the medium such as air in which the article is used, a first layer 16, a second layer 17, a third layer 18 and a fourth layer 19.

As hereinafter will be described, the coating 13 comprised of at least four layers is utilized for providing a wide band anti-reflection coating in the visible region for high and low index glasses having indices of refraction ranging from between 1.50 and 1.89. However, when only four layers are utilized as shown in FIG. 1, such a coating is particularly adaptable for use with glasses having high indices of refraction ranging from 1.60 to 1.89. The layers 16–19 are formed of materials having high and low indices of refraction. The first and second layers counting from the medium are formed respectively of low and high index materials, and the third and fourth layers are also formed respectively of low and high index materials. The first layer has an optical thickness of approximately one-quarter of the design wavelength for the coating. Design wavelength is defined as the center or the medium wavelength for which the design is used. Thus, if the coating is designed for the visible spectrum, the design wavelength would be the center or the medium wavelength of the visible spectrum or other waveband of interest. The second and fourth layers are of approximately equal optical thickness and the third layer is relatively thin but has a thickness which is at least such that the second and fourth layers function as independent layers rather than as a single layer.

It has been found that all four layers can be made utilizing only two materials, namely, magnesium fluoride (MgF$_2$ having an index of refraction of approximately 1.38) for the material having a low index of refraction, and zirconium oxide (ZrO$_2$ with an index of refractoin of 2.03) for the material having a high index of refraction.

In the manufacture of the article, the glass substrate which is to be coated is placed in a vacuum chamber over heated vapor sources. Zirconium oxide in a sintered form was utilized as the material having a high index of refraction and was placed in a tungsten boat which served as the vapor source. The pressure in the vacuum chamber was held continuously below the measured value of 2 × 10$^{-5}$ torr. No gases were bled into the vacuum chamber during the process. Magnesium fluoride was utilized for the material having a low index of refraction and was vaporized by conventional techniques in the vacuum chamber.

As pointed out above, the first layer has an optical thickness of approximately one-quarter of the design wavelength. The second, third and fourth layers preferably have a combined optical thickness of one-half of the design wavelength so that the second, third and fourth layers would be nearly equal or equivalent to a single high index layer having a half wave optical thickness but with no layer exceeding a predetermined thickness.

It has been found that when utilizing high index materials, it is difficult to reproducibly produce homogeneous films from high index materials unless the thickness is maintained below a predetermined level. This level has been found to be approximately a quarter-wave optical thickness for wavelengths in the visible and near visible regions of the spectrum. For example, it has been found that when utilizing zirconium oxide having thicknesses in excess of 1,000 Angstroms, the film displays inhomogeneous characteristics, that is, the film appears to be composed such that the index varies with thickness. It is believed that this apparent variation is such that the initially deposited portion of the film has a higher index than the final portion of the film. In connection with the present invention, it has been found that zirconium oxide films with a thickness less than 500 Angstroms do not show this characteristic to a measurable extent when observed by radiation in the visible and near visible region. In view of the foregoing considerations, it is preferable that the zirconium oxide film when utilized in wide band anti-reflection coatings such as the present, that the layer thickness not exceed approximately 500 Angstroms. By following these constraints, it has been found that zirconium oxide can be vacuum evaporated to provide a hard, durable and environmentally stable film which has negligible absorption throughout the 380–700 millimicron region.

Although in the foregoing description, the preferable quarter wave optical thicknesses for the first, second, third and fourth layers have been set forth, the quarter wave optical thicknesses of these layers in design wavelengths can be varied within the limits set forth below.

| First layer | 0.8 to 1.5 |
| Second layer | 0.5 to 1.0 |
| Third layer | 0.1 to 1.0 |
| Fourth layer | 0.5 to 1.0 |

In general, it has been found desirable that no layer have a quarter wave optical thickness less than 10 percent nor more than 150 percent of the design wavelength. However, it should be pointed out that, if desired, the thickness of the third layer can be less than 10 percent. The minimum thickness for this third layer is primarily determined by what thickness can be reproducibly produced in the manufacture of such coatings and still provide a homogeneous film. Thus, theoretically, a total physical thickness of 10 to 20 Angstroms for this layer should be sufficient if it would be reproduced in the form of a uniform thin film. In the present embodiment of the invention, it was found that in order to obtain a third layer of thin film which could be reproduced, it was desirable to utilize a thickness of approximately 150 Angstroms.

Figure 2:
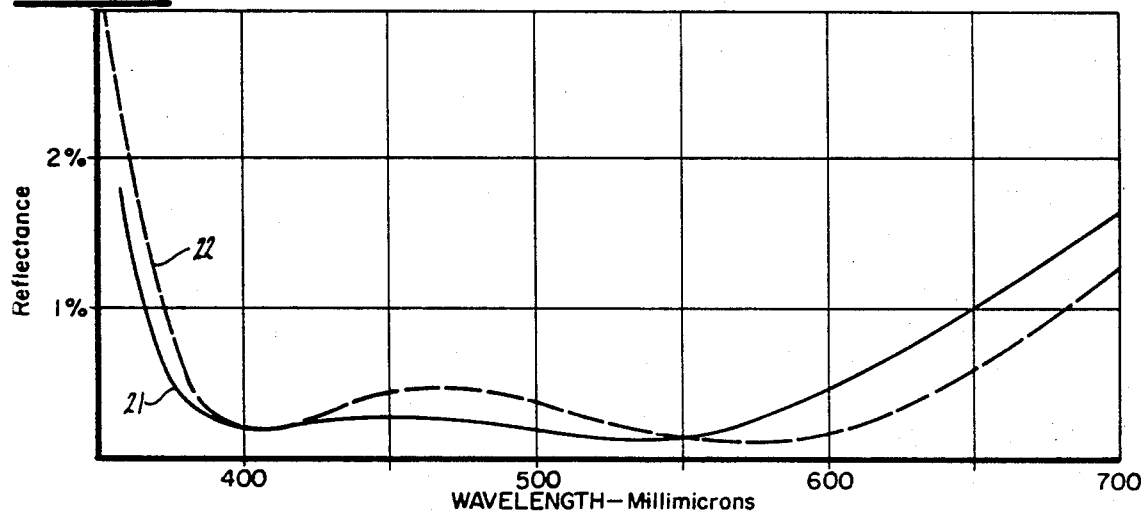
FIG. 2 is a graph showing the comparison between the actual and theoretical reflectance of the coating shown in FIG. 1.

In FIG. 2 there is shown a graph for an article consisting of a substrate having an index of refraction of 1.74 and coated with the four-layer coating shown in FIG. 1. Curve 21 shows the actual reflectance which was obtained and shows that the reflectance for the coating extends from the 350 millimicron region through the 700 millimicron region and that the average reflectance is very low, i.e., substantially below one-half of 1 percent, with a very slight rise in the center portion of the visible spectrum. The calculated theoretical curve 22 shows that the actual reflectance obtained by the coating on the substrate corresponds very closely to that which has been theoretically calculated. It will be noted that the reflectance is particularly good in the 380–660 millimicron region which is the region of particular interest for photographic applications. The 400–700 millimicron region is typical of applications involving response of the human eye.

Figure 3:
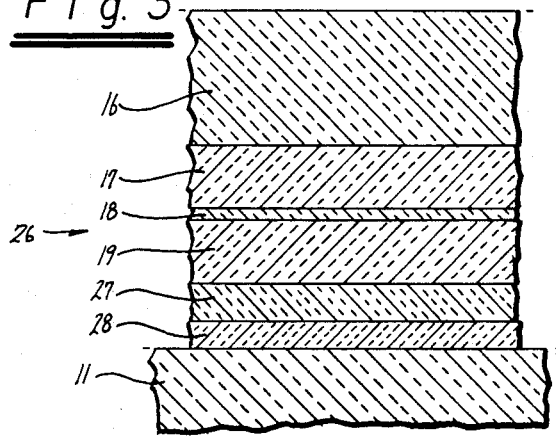
FIG. 3 is a partial cross-sectional view of an article having a coating thereon having at least six layers and being particularly adaptable for glasses having indices of refraction from 1.50 to 1.62.

It has been found that in application of the present invention to substrates having a low index of refraction as, for example, substrates having an index of refraction ranging from 1.50 to 1.62, that the coating 13 shown in FIG. 1 should be augmented to provide the anti-reflection coating 26 shown in FIG. 3 by providing at least two additional layers which can be identified counting from the medium as a fifth layer 27 and a sixth layer 28. These final fifth and sixth layers are formed respectively of a low index and high index material. The combined optical thickness of these two layers is approximately equal to one-quarter of the design wavelength. The relative thickness of the fifth and sixth layers is chosen such that the two layers together yield a reflectance which is near or equivalent to that which would be achieved by a single layer of equal optical thickness and having an index of refraction that is intermediate the two materials utilized for the fifth and sixth layers. Thus, the two layers 27 and 28 in effect synthesize a single layer having an index of refraction intermediate the indices of refraction for the two materials utilized for the layers 27 and 28.

In forming the fifth and sixth layers 27 and 28, it has been found that magnesium fluoride can be readily used for the low index material and that zirconium oxide can be utilized for the high index material so that all six layers can be formed by the utilization of only two materials.

Although it has been stated that the fifth and sixth layers 27 and 28 preferably have a combined optical thickness of one-quarter of the design wavelength, the optical thickness of both the fifth and sixth layers can be varied if desired from .1 to 1.0 of the design wavelength.

Figure 4:
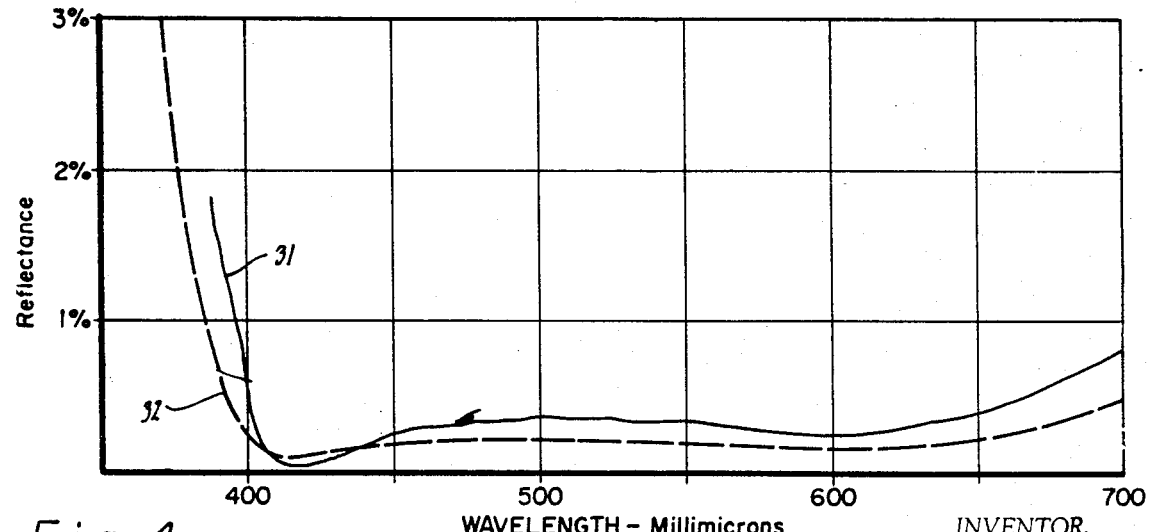
FIG. 4 is a graph showing the comparison between the theoretical and actual reflectance of a coating of the type shown in FIG. 3.

A graph showing the results which can be obtained with a coating of the type shown in FIG. 3 is shown in FIG. 4. Curve 31, shown therein, shows the actual reflectance which is obtained from a six layer coating on a glass substrate having an index of refraction of 1.52. Curve 32 shows the theoretical calculated reflectance. Curve 31 shows that excellent reflectance characteristics are obtained in which the reflectance is substantially below one-half of 1 percent throughout the region of interest with a slight raising in the center region.

In the actual embodiments of the invention which were utilized in making the graphs which are shown in FIGS. 2 and 4, the design wavelength was 490 millimicrons.

In Chart I shown below, there is shown a table of values showing the relative spectral transparency of a multi-element photographic lens (15 elements) with various anti-reflection coatings.

CHART I

Relative Spectral Transparency of a Multi-element Photographic Lens (15 elements) with Various Anti-Reflection Coatings

| Wavelength Nanometers | Single Layer MgF$_2$* I | Multilayer II | Single Layer MgF$_2$ III |
|---|---|---|---|
| 400 | 0.40 | 0.525 | 0.29 |
| 20 | 0.615 | 0.77 | 0.445 |
| 40 | 0.79 | 0.88 | 0.57 |
| 60 | 0.85 | 0.90 | 0.62 |
| 80 | 0.91 | 0.920 | 0.66 |
| 500 | 0.96 | 0.950 | 0.70 |
| 20 | 0.985 | 0.970 | 0.71 |
| 40 | 1.00 | 0.995 | 0.73 |
| 60 | 1.00 | 1.00 | 0.73 |
| 80 | 0.985 | 1.00 | 0.715 |
| 600 | 0.975 | 0.985 | 0.71 |
| 20 | 0.96 | 0.96 | 0.70 |
| 40 | 0.94 | 0.93 | 0.68 |
| 60 | 0.915 | 0.88 | 0.665 |
| 80 | 0.89 | 0.815 | 0.65 |
| 700 | 0.855 | 0.75 | 0.63 |

*Column I contains data of Column III expanded to peak at a value of 1.00 for comparison Column I contains the data of column III but expanded to peak at a value of 1.00 for comparison purposes. It can be seen that the spectral transparency of the multi-layer coating which is the coating utilizing the present invention is greatly superior to that of a single layer magnesium fluoride coating.

It is apparent from the foregoing that there has been provided a new and improved wide band anti-reflection coating and article which is coated therewith which has particularly desirable properties for the coating of optical elements utilized in connection with photography. In addition, the coating is of a type which can be manufactured without bleeding in oxygen during the process. The coating also has excellent spectral reflectance characteristics as well as good adhesion and is environmentally durable.

We claim:

1. In an optical element for use in an ambient medium in a waveband of approximately 380 to 660 millimicrons, a substrate having a normal light reflecting surface and an anti-reflection coating disposed on said reflecting surface and exposed to the medium, said anti-reflection coating comprising first, second, third and fourth layers counting in a direction from the medium and being formed of materials having high and low indices of refraction and being substantially absorption-free in the blue and ultra-violet region, said high index material being zirconium oxide and said low index material being magnesium fluoride, said first and second layers being formed respectively of low and high index materials and said third and fourth layers being formed respectively of low and high index materials, each of said second, third and fourth layers having an optical thickness which does not exceed one-quarter of the wave length of energy at a frequency within the waveband said second third and fourth layers having a combined optical thickness of approximately one-half of the wave length of energy at a frequency within the waveband, said second and fourth layers having approximately equal optical thicknesses, said second and fourth layers each having an optical thickness greater than said third layer, said third layer having an optical thickness not less than 10 percent of one-quarter of the optical thickness of the wave length of energy at a frequency within the waveband, so that said second and fourth layers function as independent layers rather than as a single layer.

2. An article as in claim 1 wherein said layers formed of zirconium oxide each have a thickness which does not exceed approximately 500 Angstroms.

3. An article as in claim 1 wherein the anti-reflection coating has six layers comprising additional fifth and sixth layers formed respectively of low and high index materials, the thickness of the fifth and sixth layers being such that they yield a reflectance which is achieved by a single layer of equal optical thickness and having an index of refraction intermediate that of the low and high index materials utilized for the fifth and sixth layers.

4. In an optical element for use in an ambient medium in a waveband of approximately 380 to 660 millimicrons, a substrate having a normal light reflecting surface and an anti-reflection coating disposed on said surface and exposed to the medium, said anti-reflection coating comprising first, second, third, fourth, fifth and sixth layers counting in a direction from the medium and being formed of materials having high and low indices of refraction and being substantially absorption-free in the blue and ultra-violet region, said low index material being magnesium fluoride and said high index material being zirconium oxide, said first and second layers being formed respectively of low and high index materials and said third and fourth layers being formed respectively of low and high index materials, said fifth and sixth layers being formed respectively of low and high index materials, each of said second, third and fourth layers having an optical thickness which does not exceed one-quarter of the wave length of energy at a frequency within the waveband, said fifth and sixth layers having a combined optical thickness such that they yield a reflectance which is achieved by a single layer of equal optical thickness and having an index of refraction intermediate that of the low and high index materials utilized for the fifth and sixth layers, said layers formed of zirconium oxide each having a thickness which does not exceed approximately 500 Angstroms.

* * * * *